US008337649B2

(12) United States Patent
Baumgart et al.

(10) Patent No.: US 8,337,649 B2
(45) Date of Patent: Dec. 25, 2012

(54) REPAIR FILM AND USE THEREOF

(75) Inventors: Hubert Baumgart, Munster (DE); Berthold Austrup, Nordkirchen (DE); Bostjan Muhic, Ljubljana (SI)

(73) Assignee: BASF Coatings GmbH, Munster (DE)

( * ) Notice: Subject to any disclaimer, the term of this patent is extended or adjusted under 35 U.S.C. 154(b) by 888 days.

(21) Appl. No.: 12/092,411

(22) PCT Filed: Nov. 9, 2006

(86) PCT No.: PCT/EP2006/010717
§ 371 (c)(1),
(2), (4) Date: May 2, 2008

(87) PCT Pub. No.: WO2007/054288
PCT Pub. Date: May 18, 2007

(65) Prior Publication Data

US 2009/0011189 A1 Jan. 8, 2009

(30) Foreign Application Priority Data

Nov. 10, 2005 (DE) ......................... 10 2005 053 661

(51) Int. Cl.

| | |
|---|---|
| ***B32B 38/10*** | (2006.01) |
| ***B32B 5/00*** | (2006.01) |
| ***B32B 27/32*** | (2006.01) |
| ***B32B 9/00*** | (2006.01) |
| ***B32B 27/36*** | (2006.01) |
| ***B32B 27/40*** | (2006.01) |
| ***B32B 33/00*** | (2006.01) |
| ***B32B 5/16*** | (2006.01) |

(52) U.S. Cl. .......... 156/94; 428/141; 428/523; 428/343; 428/354; 428/323; 428/522; 428/521; 428/423.1; 428/412; 428/413

(58) Field of Classification Search .................... 156/94; 428/141, 523, 343, 354, 323, 522, 521, 423.1, 428/412, 413
See application file for complete search history.

(56) References Cited

U.S. PATENT DOCUMENTS

| | | | | |
|---|---|---|---|---|
| 4,419,513 | A | 12/1983 | Breidenbach et al. | |
| 4,454,317 | A | 6/1984 | Disteldorf et al. | |
| 4,801,675 | A | 1/1989 | Pedain et al. | |
| 5,258,482 | A | 11/1993 | Jacobs et al. | |
| 5,290,902 | A | 3/1994 | Jacobs et al. | |
| 6,743,466 | B2 * | 6/2004 | Flosbach et al. | 427/142 |
| 2004/0052966 | A1 * | 3/2004 | Wilke et al. | 427/508 |
| 2007/0110905 | A1 * | 5/2007 | Hintze-Bruening et al. | 427/384 |

FOREIGN PATENT DOCUMENTS

| | | | |
|---|---|---|---|
| CA | 2163591 | A1 | 6/1996 |
| DE | 4015155 | A1 | 11/1991 |
| DE | 4229183 | A1 | 3/1994 |
| DE | 19818735 | A1 | 10/1999 |
| DE | 19841842 | C2 | 7/2000 |
| DE | 19908018 | A1 | 8/2000 |
| DE | 10055464 | A1 | 5/2002 |
| DE | 10316890 | A1 | 11/2004 |
| DE | 10335620 | A1 | 3/2005 |
| EP | 0183976 | A1 | 6/1986 |
| EP | 0303150 | A2 | 2/1989 |
| EP | 0496208 | A2 | 7/1992 |
| EP | 0524500 | A1 | 1/1993 |
| EP | 0531820 | A1 | 3/1993 |
| EP | 0566037 | A2 | 10/1993 |
| EP | 0646608 | A1 | 4/1995 |
| EP | 0649806 | A1 | 4/1995 |
| EP | 0352298 | B2 | 3/2001 |
| EP | 1410850 | | 4/2004 |
| EP | 1410888 | | 4/2004 |
| WO | WO9411123 | A1 | 5/1994 |
| WO | WO9749747 | A1 | 12/1997 |
| WO | 03013739 | | 2/2003 |
| WO | 03092912 | | 11/2003 |

OTHER PUBLICATIONS

International Search Report dated Nov. 9, 2006 for International Application No. PCT/EP2006/010717.

Written Opinion of International Searching Authority dated Nov. 9, 2006 for International Application No. PCT/EP2006/01071.

International Preliminary Report dated Jun. 11, 2008 for International Application No. PCT/EP2006/010717.

* cited by examiner

*Primary Examiner* — Katarzyna Wyrozebski Lee
*Assistant Examiner* — Daniel Lee
(74) *Attorney, Agent, or Firm* — Cantor Colburn LLP

(57) ABSTRACT

Disclosed herein is a refinish sheet produced by (1) coating one side of a temporary carrier sheet (A) with at least one aqueous coating material (B) comprising at least one free-radically crosslinkable binder (B1) having a glass transition temperature of −70 to +50° C., an olefinically unsaturated double bond content of 2 to 10 eq/kg, and an acid group content of 0.05 to 15 eq/kg to produce at least one resultant layer (B); and (2) drying but not curing, or only part-curing, the at least one resultant layer (B) to produce at least one dried, uncured or part-cured layer (B). Also disclosed is a method of repairing a surface of a coated substrate using the refinish sheet.

20 Claims, No Drawings

REPAIR FILM AND USE THEREOF

CROSS REFERENCE TO RELATED APPLICATIONS

This application is a National Phase Application of International Patent Application PCT/EP2006/010717, filed on Nov. 9, 2006, which claims priority to German patent application DE 10 2005 053 661.1, filed on Nov. 10, 2005.

FIELD OF THE INVENTION

The present invention relates to new refinish sheets. Additionally the present invention relates to the use of the new refinish sheets for repairing the surface of coated substrates.

BACKGROUND

A process for repairing the surface of coated substrates that involves a) providing a substrate having a damaged surface, b) coating a carrier sheet on one side with a layer of an uncured or part-cured coating material, c) applying the carrier sheet by its coated side to the repair site, d) fully curing the layer of the coating material with heat, and e) removing the carrier sheet, the layer of the coating material being heat-treated through the carrier sheet or following removal of the carrier sheet, is known from international patent application WO 03/092912. A similar process in which the layer of the coating material is cured with high-energy radiation, or UV radiation, is known from the American patent U.S. Pat. No. 6,743,466 B2.

European patent application EP 1 410 850 A2 discloses in general terms a similar process for producing coatings that involves fully curing the layer of the coating material likewise with heat.

European patent application EP 1 410 888 A2 discloses in general terms a similar process for producing coatings that involves fully curing the layer of the coating material with high-energy radiation, such as with UV radiation.

Although it is said, for example, in European patent application EP 1 410 888 A2, column 7, paragraph [0028], that the coating material may also include water, the examples of the three aforementioned patent applications and of the aforementioned American patent use only a coating material which comprises organic solvents and a urethane acrylate that is curable by free-radical polymerization, is free of acid groups, and has an olefinically unsaturated double bond content of 1.927 eq/kg.

The conventional coating materials, however, have the drawback that considerable volumes of volatile organic solvents are emitted in the course of the production of the coated sheets. This leads to safety and environmental problems for the manufacturer of the coated sheets. Any residues of volatile organic solvents that may still be present in the coated sheets, as well, may lead to comparable problems for the user, in the case, for example, of the refinishing of damaged automobile finishes in the painting workshop, for example.

It would therefore be desirable to have available, for repair purposes, coated sheets whose coatings can be produced from aqueous coating materials.

In the patent applications cited above, however, there are no details of what measures might be taken in order to provide aqueous coating materials which have the same profile of properties as the known, conventional coating materials, are suitable for the known refinish process, and produce coatings meeting all of the requirements that are imposed on automotive refinishes.

SUMMARY

It is an object of the present invention to provide new refinish films which comprise a carrier sheet and at least one layer of a cured or part-cured coating material and which are producible by means of an aqueous coating material.

The new refinish sheets ought to be suitable for repairing the surface of coated substrates by applying the carrier film by its coated side to the repair site, curing the layer of the coating material with actinic radiation, and removing the carrier film, the layer of the coating material being cured through the carrier film or following removal of the carrier film, using actinic radiation.

The resultant refinishes ought to meet all of the requirements that are imposed on automotive finishes (cf. European patent EP 0 352 298 B1, page 15, line 42, to page 17, line 40) and in terms of their appearance ought to correspond fully to a Class A surface. In particular they ought to be stable to weathering, resistant to chemicals, and scratch resistant.

Found accordingly have been the new refinish sheets producible by (1) coating one side of a temporary carrier sheet (A) with at least one aqueous coating material (B) comprising at least one binder (B1) having a glass transition temperature of −70 to +50° C., an olefinically unsaturated double bond content of 2 to 10 eq/kg, and an acid group content of 0.05 to 15 eq/kg and (2) drying but not curing, or only part-curing, the resultant layer(s) (B).

The new refinish sheets are referred to below as "sheets of the invention".

Also found has been the new method of repairing the surface of coated substrates, which involves (I) laminating at least one sheet of the invention with the coated side on to the location(s) on the substrate surface that require repair and (II) fully curing with actinic radiation the curable layer(s) (B) before or after the temporary carrier sheet (A) has been taken away.

The new method of repairing the surface of coated substrates is referred to below as "method of the invention".

Additional subject matter of the invention will become apparent from the description.

In the light of the prior art it was surprising and unforeseeable for the skilled worker that the object on which the present invention was based could be achieved by means of the sheets of the invention and by means of the method of the invention.

In particular it was surprising that the refinish sheets of the invention were easy to produce, the reproducibility being outstanding. They were also stable on storage in the absence of actinic radiation and tack-free, and so could readily be wound into rolls, transported, and stored. Following transport and/or storage, they could be unwound again from the rolls without damage and cut to the shapes and sizes required for the respective uses.

A further surprise was that the method of the invention was easy to carry out and gave outstandingly reproducible results.

A significant advantage was that, in the production and handling of the sheets of the invention, and also in the case of the method of the invention, the emission of volatile organic compounds could be significantly reduced or wholly avoided.

The refinishes of the invention resulting in the case of the method of the invention met all of the requirements imposed on automotive finishes (cf. European patent EP 0 352 298 B1, page 15, line 42, to page 17, line 40) and in certain cases even exceeded them. In terms of their appearance they corresponded completely to a class A surface. Furthermore they were stable to weathering, resistant to chemicals, and highly scratch resistant.

DETAILED DESCRIPTION OF THE INVENTION

1. The Sheet of the Invention

1.1 The Temporary Carrier Sheet (A)

The first essential constituent of the sheet of the invention is the temporary carrier sheet (A).

"Temporary" means that, following its use in accordance with the invention, the carrier sheet (A) can be removed from the refinishes of the invention produced by means of the method of the invention.

Suitable temporary carrier sheets (A) include all sheets—polymeric sheets, metal sheets, and metallized polymeric sheets—which have sufficient stability with respect to mechanical stress, thermal energy, actinic radiation, and the constituents employed in the coating materials (B) for inventive use. Preference is given to using polymeric sheets, more preferably transparent polymeric sheets.

Examples of suitable polymeric sheets are known from German patent application DE 103 35 620 A2, paragraphs [0018] and [0019].

As temporary carrier sheets (A) it is preferred to use polymeric sheets having

- a storage modulus E' of $10^7$ to $10^9$ Pa, in particular $10^7$ to $10^8$ Pa, in the temperature range from room temperature to 100° C.,
- a breaking elongation at 23° C. of 300% to 1500%, in particular 400% to 1000%, longitudinally and transversely with respect to the preferential direction generated during the production of (A) by means of directed production techniques, such as extrusion or film blowing, and
- a transmittance>70% for UV radiation and visible light with a wavelength of 230 to 600 nm at a path length of 50 μm The side of these sheets that faces the dried, uncured or part-cured layer(s) (B) or the coating(s) (B) producible therefrom has

- a hardness of 0.005 to 0.06 GPa, in particular 0.005 to 0.02 GPa, at 23° C. (nanohardness, measured using a Berkovich indenter at 1 mN) and
- a roughness as determined by means of atomic force microscopy (AFM) that corresponds to an $R_a$ value over a 50 $\mu m^2$ sampling area of 5 to 30 nm, in particular 5 to 25 nm.

The temporary carrier sheet (A) exhibits an adhesion to the curable layers (B) which is secure enough to allow the sheets of the invention to be manufactured, stored, and transported without problems. On the other hand, the adhesion to the curable layers (B) and to the coatings (B) produced by the method of the invention is not so secure that the layers or coatings (B) in question are damaged when the temporary carrier sheet (A) is detached.

Removal of the temporary carrier sheet (A) from the outer surface of the dried, uncured or part-cured layer(s) (B) or from the coating(s) (B) producible therefrom preferably requires an averaged force of 10 to 250 mN/cm, in particular 10 to 100 mN/cm.

With particular preference the temporary carrier sheet (A) is selected from the group consisting of sheets of polyethylene, polypropylene, ethylene copolymers, propylene copolymers, and ethylene-propylene copolymers.

With particular preference the side of the sheet that faces the dried, uncured or part-cured layer(s) (B) or the coating(s) (B) producible therefrom has adhesive properties and/or embossing.

The embossing in question may be imagewise embossing which serves for decoration and/or signaling, such as writing for example. The embossing is preferably in the pm range with a light-scattering effect, so as to produce a matting effect.

With particular preference the side of the temporary carrier sheet (A) that faces away from the dried, uncured or part-cured layer(s) (B) or from the coating(s) (B) producible therefrom has antiblocking properties.

With very particular preference the temporary carrier sheet (A) is composed of a plurality of layers.

In particular it is constructed from at least one, preferably one, core layer (A1) comprising

- at least one, preferably one, homopolymer or copolymer selected preferably from the group consisting of polyethylene, polypropylene, ethylene copolymers, propylene copolymers, and ethylene-propylene copolymers, and
- at least one, preferably two, further layer(s), selected from the group consisting of adhesive layers (A2) and antiblocking layers (A3), preferably from an adhesive layer (A2) and an antiblocking layer (A3).

The thickness of the temporary carrier sheet (A) may vary widely and is guided by the requirements of the case in hand. Preferably it has a thickness of 10 to 100 μm, in particular 30 to 70 μm.

The above-described temporary carrier sheets (A) are customary and known and can be acquired from, for example, Bischoff+Klein, Lengerich, Federal Republic of Germany.

1.2 The Layer (B)

The second essential constituent of the sheet of the invention is at least one, especially one, layer (B).

The layer (B) covers one side of the temporary carrier sheet (A) partially, imagewise for example, or entirely or substantially entirely. Preferably the temporary carrier sheet (A) is covered substantially entirely.

"Substantially entirely" means that a small edge region, for example, at least one narrow edge strip, or at least one corner of the temporary carrier sheet (A) remains uncovered, so making it easier for the temporary carrier sheet (A) to be taken off as part of the method of the invention.

The layer (B) is dried, i.e., it is entirely or substantially free from water and organic solvents.

"Substantially free" means that the layer (B) in question has a water content and/or a solvent content of in each case <10%, preferably in each case <5%, and in particular in each case <2%, by weight, based in each case on the layer (B).

"Entirely free from" means that the water content and/or solvent content are each below the customary and known detection limits for water and organic solvents.

The layer (B) is uncured or part-cured.

"Part-cured" means that the three-dimensional network formed on curing or crosslinking does not dictate the profile of properties of the layer (B), but that instead, the layer (B) remains mechanically deformable and in particular exhibits thermoplastic rather than thermoset behavior.

The layer (B) is curable with actinic radiation.

Actinic radiation for the purposes of the present invention means electromagnetic radiation, such as near infrared (NIR), visible light, UV radiation, X-radiation or gamma radiation, preferably UV radiation, especially UV-A radiation, and particulate radiation, such as electron beams, proton beams, alpha radiation, beta radiation or neutron beams, especially electron beams.

The thickness of the layer (B) may vary very widely and is guided by the requirements of the case in hand.

Preferably the layer (B) is 1 to 200 μm thick, more preferably 5 to 200 μm, very preferably 10 to 100 μm, and in particular 20 to 80 μm thick.

The layer thickness is set preferably such that curing of the layer (B) with actinic radiation results in a coating (B) having a thickness of 5 to 100 μm, more preferably 10 to 80 μm, and in particular 10 to 70 μm.

The thickness of the layer (B) preferably decreases toward the edges of the sheets of the invention; in other words, the layer (B) runs out toward the edges. This results in a coating (B) whose layer thickness varies in the same way. This avoids a noticeable edge break in the refinish of the invention produced by the method of the invention with the aid of the sheet of the invention in question.

The layer (B) is preparable from an aqueous coating material (B).

The aqueous coating material (B) comprises at least one, especially one, free-radically crosslinkable binder (B1) having

- a glass transition temperature of −70 to +50° C., preferably −60 to +20° C., and in particular −60 to +10° C.,
- an olefinically unsaturated double bond content of 2 to 10 eq/kg, preferably 2 to 8 eq/kg, more preferably 2.1 to 6 eq/kg, very preferably 2.2 to 6 eq/kg, with especial preference 2.3 to 5 eq/kg, and in particular 2.5 to 5 eq/kg of the binder (B1), and
- an acid group content of 0.05 to 15 eq/kg, preferably 0.08 to 10 eq/kg, more preferably 0.1 to 8 eq/kg, very preferably 0.15 to 5 eq/kg, with especial preference 0.18 to 3 eq/kg, and in particular 0.2 to 2 eq/kg of the binder (B1).

The acid group content is determined preferably via the acid number in accordance with DIN EN ISO 3682.

The olefinically unsaturated double bonds are present preferably in groups selected from the group consisting of (meth) acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, preferably (meth)acrylate groups. In particular the olefinically unsaturated double bonds are present in acrylate groups.

The binders (B1) are oligomeric or polymeric.

"Oligomeric" means that the binder (B1) in question is composed of 3 to 12 monomeric structural units.

"Polymeric" means that the binder (B1) in question is composed of more than 8 monomeric structural units.

Whether a binder (B1) composed of 8 to 12 monomeric structural units is considered an oligomer or a polymer depends primarily on its number-average molecular weight.

The number-average molecular weight of the binder (B1) may vary very widely and is guided by the requirements of the case in hand, in particular by the viscosity which is advantageous for the processing of the binder (B1) and of the coating material (B) prepared therewith. Hence the viscosity of the coating material (B) is usually set so as to provide for trouble-free application to the temporary carrier sheet (A) and for ready filming of the resultant layer (B) on drying.

The number-average molecular weight is preferably 1000 to 50 000 daltons, more preferably 1500 to 40 000 daltons, and in particular 2000 to 20 000.

The polydispersity of the molecular weight may likewise vary widely and is preferably 1 to 10, in particular 1.5 to 8.

Suitable binders (B1) include all oligomers and polymers having the profile of properties described above.

The binder (B1) is preferably selected from the group consisting of oligomeric and polymeric epoxy (meth)acrylates, urethane (meth)acrylates, and carbonate (meth)acrylates. Urethane (meth)acrylates in particular are used.

The urethane (meth)acrylates are preparable by reacting (b1) at least one compound containing at least two isocyanate groups and selected from the group consisting of aliphatic, aromatic or cycloaliphatic di- and polyisocyanates with (b2) at least one compound having at least one, especially one, isocyanate-reactive functional group selected preferably from the group consisting of hydroxyl groups, thiol groups, and primary and secondary amino groups, especially hydroxyl groups, and at least one, especially one, of the above-described groups which contain a free-radically polymerizable, olefinically unsaturated double bond, preferably a (meth)acrylate group, in particular an acrylate group, (b3) at least one compound having at least one, especially one, isocyanate-reactive functional group and at least one, especially one, acid group selected preferably from the group consisting of carboxylic, phosphonic, phosphinic, sulfonic, and sulfinic acid groups, preferably carboxylic and sulfonic acid groups, in particular carboxylic acid groups, and also (b4) if desired, at least one compound having at least two, especially two, isocyanate-reactive functional groups.

Examples of suitable compounds (b1) are customary and known di- and polyisocyanates having an isocyanate functionality of on average 2 to 6, preferably 2 to 5, and in particular 2to4.

"Aliphatic" means that the isocyanate group in question is linked to an aliphatic carbon atom.

"Cycloaliphatic" means that the isocyanate group in question is linked to a cycloaliphatic carbon atom.

"Aromatic" means that the isocyanate group in question is linked to an aromatic carbon atom.

Examples of suitable aliphatic diisocyanates (b1) are aliphatic diisocyanates, such as tetramethylene diisocyanate, pentamethylene diisocyanate, hexamethylene diisocyanate, octamethylene diisocyanate, decamethylene diisocyanate, dodecamethylene diisocyanate, tetradecamethylene diisocyanate, derivatives of lysine diisocyanate, tetramethylxylylidene diisocyanate, trimethylhexane diisocyanate or 1,3- or 1,4-bis-(isocyanatomethyl)cyclohexane.

Examples of suitable cycloaliphatic diisocyanates (b1) are 1,4-, 1,3- or 1,2-diisocyanato-cyclohexane, tetramethylcyclohexane diisocyanate, bis(4'-isocyanatocyclohexyl)methane, (4'-isocyanatocyclohexyl)(2'-isocyanatocyclohexyl) methane, 2,2-bis(isocyanatocyclo-hexyl)propane, 2-(4'-isocyanatocyclohexyl)-2-(2'-isocyanatocyclohexyl)propane, 1-iso-cyanato-3,3,5-trimethyl-5-(isocyanatomethyl)cyclohexane (isophorone diisocyanate), 2,4- or 2,6-diisocyanato-1-methylcyclohexane or diisocyanates derived from dimer fatty acids, such as are sold under the trade name DDI 1410 by Henkel and are described in patents WO 97/49745 and WO 97/49747, such as 2-heptyl-3,4-bis(9-isocyanatononyl)-1-pentyl-cyclohexane.

Examples of suitable aromatic diisocyanates (b1) are 2,4- or 2,6-tolylidene diisocyanate or their isomer mixtures, m- or p-xylylene diisocyanate, 2,4'- or 4,4'-diisocyanato-diphenylmethane or their isomer mixtures, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate, 1,4-diisocyanatobenzene or 4,4'-diisocyanatodiphenyl ether.

It is preferred to use aliphatic and cycloaliphatic diisocyanates (b1), particularly hexamethylene diisocyanate, 1,3-bis(isocyanatomethyl)cyclohexane, isophorone diisocyanate and/or di(isocyanatocyclohexyl)methane.

Examples of suitable polyisocyanates (b1) are triisocyanates such as nonane triisocyanate (NTI) and also polyisocyanates (b1) based on the above-described diisocyanates and triisocyanates (b1), especially oligomers containing isocyanurate, biuret, allophanate, iminooxadiazinedione, urethane, carbodiimide, urea, uretonimine and/or uret dione groups. Examples of suitable such polyisocyanates (b1) and also processes for their preparation are known from, for example, the patents and patent applications CA 2,163,591 A 1, U.S. Pat. No. 4,419,513 A, U.S. Pat. No. 4,454,317 A, EP 0 646 608 A 1, U.S. Pat. No. 4,801,675 A, EP 0 183 976 A 1, DE 40 15 155 A 1, EP 0 303 150 A 1, EP 0 496 208 A 1, EP 0 524 500 A 1, EP 0 566 037 A 1, U.S. Pat. No. 5,258,482 A, U.S. Pat. No. 5,290,902 A, EP 0 649 806 A 1, DE 42 29 183 A 1 or EP 0 531 820 A 1.

It is preferred to use the oligomers (b1) of hexamethylene diisocyanate and of isophorone diisocyanate.

Examples of suitable compounds (b2) are the monoesters of (b21) diols and polyols containing preferably 2 to 20 carbon atoms and at least 2 hydroxyl groups in the molecule, such as ethylene glycol, diethylene glycol, triethylene glycol, 1,2-propylene glycol, 1,3-propylene glycol, 1,1-dimethyl-1,2-ethanediol, dipropylene glycol, tripropylene glycol, tetraethylene glycol, pentaethylene glycol, 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, pentaerythritol, dipentaerythritol, ditrimethylolpropane, erythritol, sorbitol, polytetrahydrofuran having an average molecular weight of 162 to 2000, poly-1,3-propanediol having an average molecular weight of 134 to 400 or polyethylene glycol having a molecular weight of between 150 and 500, especially ethylene glycol, with (b22) alpha,beta-unsaturated carboxylic acids, such as acrylic acid, methacrylic acid, crotonic acid, itaconic acid, fumaric acid, maleic acid, acrylamidoglycolic acid, methacrylamidoglycolic acid, especially acrylic acid.

Further examples of suitable compounds (b2) are the monovinyl ethers of the above-described diols and polyols (b21).

Further examples of suitable compounds (b2) are the monoesters or monoamides of the above-described alpha, beta-unsaturated carboxylic acids (b22) with (b23) amino alcohols, such as 2-aminoethanol, 2-(methylamino)ethanol, 3-amino-1-propanol, 1-amino-2-propanol or 2-(2-aminoethoxy)ethanol, (b24) thioalcohols, such as 2-mercaptoethanol, or (b25) polyamines, such as ethylenediamine or diethylenetriamine.

In particular, 2-hydroxyethyl acrylate is used.

Examples of suitable compounds (b3) are (b31) hydroxy carboxylic acids, such as hydroxyacetic acid (glycolic acid), 2- or 3-hydroxypropionic acid, 3- or 4-hydroxybutyric acid, hydroxypivalic acid, 6-hydroxycaproic acid, citric acid, malic acid, tartaric acid, 2,3-dihydroxypropionic acid (glyceric acid), dimethylolpropionic acid, dimethylolbutyric acid, trimethylolacetic acid, salicylic acid, 3- or 4-hydroxybenzoic acid or 2-, 3- or 4-hydroxycinnamic acid, (b32) amino acids, such as 6-aminocaproic acid, aminoacetic acid (glycine), 2-amino-propionic acid (alanine), 3-aminopropionic acid (beta-alanine) or the other essential amino acids; N,N-bis(2-hydroxyethyl)glycine, N-[bis(hydroxymethyl)-methyl]glycine or imidodiacetic acid, (b33) sugar acids, such as gluconic acid, glucaric acid, glucuronic acid, galacturonic acid or mucic acid (galactaric acid), (b34) thiol carboxylic acids, such as mercaptoacetic acid, or (b35) sulfonic acids, such as 2-aminoethanesulfonic acid (taurine), aminomethanesulfonic acid, 3-aminopropanesulfonic acid, 2-[4-(2-hydroxyethyl)-1-piperazinyl]ethanesulfonic acid, 3-[4-(2-hydroxyethyl)piperazinyl]propanesulfonic acid, N-[tris(hydroxymethyl)methyl]-2-aminoethanesulfonic acid, N,N-bis(2-hydroxyethyl)-2-aminoethanesulfonic acid, 5-sulfosalicylic acid, 8-hydroxyquinoline-5-sulfonic acid, phenol-4-sulfonic acid or sulfanilic acid.

In particular, hydroxyacetic acid (glycolic acid) is used.

The acid groups may be ionized.

Examples of suitable counterions are lithium, sodium, potassium, rubidium, cesium, magnesium, strontium, barium or ammonium ions and also primary, secondary, tertiary or quaternary ammonium ions deriving from customary and known organic amines.

Examples of suitable compounds (b4) are the above-described diols and polyols (b21), amino alcohols (b23), thioalcohols (b24) or polyamines (b25).

To prepare the urethane (meth)acrylates (B1) it is preferred to react compounds (b1), (b2), and (b3) and also, if desired, (b4) with one another in a molar ratio such that for 3 eq of isocyanate groups from compound (b1) there are

- 0.5 to 3, preferably 0.8 to 2.5, more preferably 1.0 to 2.2, and in particular 1.4 to 1.8 eq of isocyanate-reactive functional groups from compound (b2) and
- 0.001 to 1.5, preferably 0.005 to 1.0, more preferably 0.01 to 0.8 and in particular 0.1 to 0.5 eq of isocyanate-reactive functional groups from compound (b3), and also, if desired,
- 0 to 2, preferably 0.1 to 1.8, more preferably 0.5 to 1.5, and in particular 0.8 to 1.3 eq of isocyanate-reactive functional groups from compound (b4).

Viewed in terms of method, the preparation of the urethane (meth)acrylate (B1) has no peculiarities but instead takes place under the customary and known conditions of the reaction of polyisocyanates in the absence of water at temperatures of 5 to 100° C. To inhibit polymerization of the olefinically unsaturated double bonds it is preferred to operate under an oxygenous gas, in particular under air or air/nitrogen mixtures.

The amount of binder (B1) in the aqueous coating material (B) may vary very widely. The amount is preferably 20% to 100%, more preferably 30% to 99%, very preferably 40% to 98%, with particular preference 50% to 97%, and in particular 60% to 95% by weight, based in each case on the film-forming solids of the aqueous coating material (B1).

The film-forming solids of the aqueous coating material may therefore be composed of the binder (B1).

Preferably, however, the coating material (B) further comprises at least one customary and known additive (B2) such as is commonly used in clearcoat materials, in customary and known amounts.

The additive (B2) is preferably selected from the group consisting of salts which are decomposable thermally without residue or substantially without residue; binders different from the binders (B) and curable physically, thermally and/or with actinic radiation; neutralizing agents; reactive diluents curable thermally; reactive diluents curable with actinic radiation; molecularly dispersely soluble dyes; transparent pigments; nanoparticles; light stabilizers; antioxidants; devolatilizers; wetting agents; emulsifiers; slip additives; polymerization inhibitors; free-radical polymerization initiators, in particular photoinitiators; thermolabile free-radical initiators; adhesion promoters; flow control agents; film formation auxiliaries; rheological assistants, such as thickeners and structurally viscous sag control agents (SCAs); flame retardants; corrosion inhibitors; free-flow aids; waxes; siccatives; biocides; and matting agents.

With preference the aqueous coating material (B) comprises salts which can be decomposed thermally without, or substantially without, residue, light stabilizers, wetting agents, emulsifiers, flow control agents, photoinitiators, and rheological assistants as additives (B2).

The aqueous coating material (B) may be a molecularly disperse solution or a dispersion. The dispersion in turn may be a suspension or an emulsion.

The aqueous coating material (B) is preferably a structurally viscous dispersion free substantially or entirely from volatile organic compounds and comprising as its disperse phase solid and/or highly viscous particles which are dimensionally stable under storage and application conditions and have a z-mean average particle size as measured by photon correlation spectroscopy of 80 to 750 nm, preferably 80 to 600 nm, and in particular 80 to 400 nm.

Photon correlation spectroscopy is a customary and known method of measuring dispersed particles having particle sizes <1 μm. The measurement may be implemented for example by means of the Malvern® Zetasizer 1000.

The particle size distribution can be adjusted in any desired way. Preferably the particle size distribution results from the use of appropriate wetting agents (B2).

The viscosity behavior referred to as "structurally viscous" describes a state which takes account on the one hand of the needs of application and also, on the other hand, of the requirements in terms of storage stability and settling stability: In the mobile state, such as when the structurally viscous aqueous dispersion (B) is being pumped around in the circuit of a coating plant, for example, and during application, the structurally viscous aqueous dispersion (B) adopts a low-viscosity state which ensures good processing properties. Absent shearing stress, in contrast, the viscosity increases and hence ensures that the coating material (B) already on the temporary carrier sheet (A) to be coated exhibits a reduced tendency to sag on vertical surfaces ("curtaining"). In the same way the higher viscosity in the immobile state, such as during storage, for instance, means that settling of the solid particles is very largely prevented or ensures that, in the event of any slight settling during the storage period, the structurally viscous aqueous dispersion (B) can be re-established by agitation.

The structurally viscous behavior is set preferably by means of suitable thickeners (B2), especially nonionic and ionic thickeners (B2), which are present in the aqueous phase.

For the structurally viscous behavior it is preferred to set a viscosity range of 50 to 1500 mPas at a shear rate of 1000 $s^{-1}$ and of 150 to 8000 mPas at a shear rate of 10 $s^{-1}$, and also of 180 to 12 000 mPas at a shear rate of 1 $s^{-1}$.

"Dimensionally stable" means that, under the customary and known conditions of storage and application of structurally viscous, aqueous dispersions, the particles exhibit only slight agglomeration and/or breakdown into smaller particles, if any at all, but instead substantially preserve their original form even under the influence of shearing forces.

Conventionally, structurally viscous aqueous dispersions (B) of the kind described above are also referred to by those in the art as clearcoat slurries.

The clearcoat slurry (B) for use in accordance with the invention is prepared preferably by the secondary dispersion process known from German patent application DE 199 08 018 A1, German patent DE 198 41 842 C2 or German patent application DE 100 55 464 A1.

In this process the ionically stabilizable binders (B1) and also, where appropriate, the additives (B2) are dissolved in organic solvents, especially in water-miscible solvents that are readily volatile. The resulting solutions are dispersed in water with the aid of neutralizing agents (B2). This is followed by dilution with water, accompanied by stirring. The initial product is a water-in-oil emulsion, which on further dilution undergoes inversion to an oil-in-water emulsion. This inversion point is generally reached at solids contents of <50% by weight, based on the emulsion, and can be recognized externally from a relatively sharp drop in viscosity during dilution.

The oil-in-water emulsion can also be prepared directly by the melt emulsification of the binders (B1) and also, where appropriate, of the additives (B2) in water.

It is of advantage here if the wetting agents (B2) are added to the organic solution and/or to the water before or during emulsification. Preferably they are added to the organic solution.

The emulsion thus obtained, which still contains solvent, is subsequently freed from solvents by means of azeotropic distillation.

In accordance with the invention it is of advantage if the solvents to be removed are distilled off at a distillation temperature below 70° C., preferably below 50° C., and in particular below 40° C. Where appropriate the distillation pressure in this case is chosen such that in the case of relatively high-boiling solvents the temperature is kept within this range.

In the simplest case the azeotropic distillation can be brought about by stirring the emulsion at room temperature in the open vessel for several days. In the preferred case the solvent-containing emulsion is freed from the solvents by means of vacuum distillation.

In order to avoid high viscosities, the quantity of water and solvents removed by evaporation or distillation is replaced by water. The water can be added before, after or else during the evaporation or distillation, and can be added in portions.

Following the loss of solvents there is a rise in the glass transition temperature of the dispersed, dimensionally stable particles, and instead of the previous solvent-containing emulsion the structurally viscous aqueous dispersion (B) is formed, i.e., the clearcoat slurry (B).

Where appropriate the dimensionally stable particles are mechanically comminuted in the wet state, this also being referred to as wet grinding. In this context it is preferred to employ conditions such that the temperature of the material for grinding does not exceed 70° C., more preferably 60° C., and in particular 50° C. The specific energy input during the grinding operation is preferably 10 to 1000, more preferably 15 to 750, and in particular 20 to 500 Wh/g.

Wet grinding can be carried out employing any of a very wide variety of apparatus which generate high or low shear fields.

Examples of suitable apparatus generating low shear fields are customary and known stirred tanks, slot homogenizers, microfluidizers or dissolvers.

Examples of suitable apparatus generating high shear fields are customary and known agitator mills or inline dissolvers.

Particular preference is given to employing the apparatus that generate high shear fields. Of such apparatus, the agitator mills are particularly advantageous in accordance with the invention and are therefore used with very particular preference.

In the case of wet grinding, generally speaking, the slurry of the invention, with the aid of suitable devices, such as pumps, especially gear pumps, is supplied to the above-described apparatus and circulated via said apparatus until the desired particle size has been reached.

The clearcoat slurry (B) advantageously has a solids content of 10% to 60% by weight, in particular of 20% to 50% by weight.

The clearcoat slurry (B) is preferably filtered before being used. This is done using the customary and known filtration equipment and filters. The mesh size of the filters may vary widely and is guided primarily by the size and size distribution of the particles. The skilled worker is therefore able to determine the appropriate filters easily on the basis of this physical parameter. Examples of suitable filters are monofilament flat or bag filters. These are available on the market under the brand names Pong® or Cuno®.

1.3 The Production of the Sheet of the Invention

The sheet of the invention is producible by coating one side of the temporary carrier sheet (A) with at least one, especially one, aqueous coating material (B), in particular a clearcoat slurry (B). Thereafter the resulting layer(s) (B) is or are dried. For that purpose conditions are chosen under which the layers (B) are not cured or are only part-cured. Operation takes place in particular in the absence of actinic radiation.

Viewed in terms of its method, the application of the aqueous coating material (B), in particular of the clearcoat slurry (B), exhibits no peculiarities but can instead take place by means of the customary and known methods of applying liquid coating materials, such as injecting, spraying, knife-coating, spreading, pouring, dipping, trickling or rolling, for example.

Application may take place continuously, as for example in a film coating unit, or discontinuously, as for example with temporary carrier sheets (A) already cut to size.

The aqueous coating material (B), especially the clearcoat slurry (B), is preferably applied such that the layer (B) runs out toward the edges of the sheet of the invention.

Following its application the aqueous coating material (B), especially the clearcoat slurry (B), dries without problems and exhibits filming at the processing temperature, generally at room temperature. In other words the clearcoat slurry (B), applied as a wet film, loses water when flushed off at room temperature or slightly elevated temperatures, with the particles present therein changing their original form and coalescing. Drying can be accelerated through the use of a gaseous, liquid and/or solid, hot medium, such as hot air, heated oil or heated rollers, or of microwave radiation, infrared light and/or near infrared light (NIR). It should be ensured here that full crosslinking does not take place as a result of thermally initiated free-radical polymerization. Preferably the wet film is dried in a forced-air oven at 23 to 150° C., more preferably 30 to 120° C., and in particular 50 to 100° C.

The resulting sheet (A/B) of the invention can be used inventively.

The outer surface of the layer (B) or of the layers (B) can alternatively be coated partly, imagewise for example, or entirely with at least one further, uncured or part-cured layer (C) which is curable physically, thermally and/or with actinic radiation.

The layer(s) (C) is or are selected from the group consisting of layers which serve to produce color and/or effect basecoats, surfacer coats, and antistonechip priming coats.

Customary and known coating materials (C) can be used for this purpose. Preference is given to using customary and known, commercially available basecoat materials, especially aqueous basecoat materials, aqueous, conventional or powder surfacers, and aqueous, conventional or powder coating materials for producing antistonechip priming coats. They are applied, and subsequently dried, by means of the customary and known application techniques and apparatus.

In this way the sheets of the invention can be adapted outstandingly to the construction and physical composition of the coatings that are to be repaired.

2. The Method of the Invention

The sheets (A/B) or (A/B/C) of the invention are outstandingly suitable for repairing sites of damage on or in the surface of coated substrates. On account of their advantageous mechanical properties the sheets of the invention also adapt themselves outstandingly to the surface of substrates of complex shape.

Preferably the substrates are composed of metals, plastics, wood, ceramic, stone, textile, fiber composites, leather, glass, glass fibers, glass wool and rockwool, mineral-bound and resin-bound building materials, such as plasterboard and cement slabs or roofing shingles, and composites of these materials.

The substrates may be coated in any of a very wide variety of ways. It is therefore preferred to use sheets of the invention whose layers (B), or (B) and (C), have the same, or substantially the same construction and/or physical composition as the corresponding layers in the coatings that are to be repaired.

The sheets of the invention are suitable outstandingly, therefore, for the repair of coatings on

- means of land, water or air transport which are operated by muscle power, hot air or wind, such as cycles, railroad trolleys, row boats, sail boats, hot air balloons, gas balloons or sailplanes, and also parts thereof,
- motorized means of land, water or air transport, such as motorcycles, utility vehicles or motor vehicles, especially automobiles, watergoing or underwater craft or aircraft and also parts thereof,
- stationary floating bodies, such as buoys or parts of harbor installations,
- the interior and exterior of buildings,
- doors, windows, and furniture and
- hollow glassware,
- small parts, hubcaps or wheel rims,
- containers, such as coils, freight containers or packaging,
- electrical components,
- optical components,
- mechanical components, and
- white goods, such as household appliances, boilers, and radiators.

They are suitable in particular for the refinishing of automotive finishes, particularly the finishes of top-class automobiles. The refinish may be of a small area, as a spot repair for example, or of a large area, either on the line in the automaker's plant, as an end-of-line repair, for example, or in the painting workshop.

For these purposes the sheets of the invention may readily be cut to the particular appropriate size.

Prior to refinishing, the damaged surfaces may be pretreated in the area of the repair sites. This can be done, for example, by partially dissolving the surface using an organic solvent, smoothing, sanding, corona treatment or flame treatment. It is a particular advantage of the method of the invention and of the sheets of the invention that in many cases such pretreatments can be omitted.

In the case of the method of the invention at least one sheet of the invention, preferably of appropriate size, is laminated by its coated side onto the repair site(s). This can be done using pressure and/or heat.

Subsequently the layer (B) of the laminated sheet of the invention is cured with actinic radiation.

Irradiation here may take place through the temporary carrier sheet (A). Alternatively, the latter sheet can be removed prior to irradiation. It is also possible, though, for irradiation to be carried out before and after the temporary carrier sheet (A) has been taken away.

Preferably irradiation takes place through the temporary carrier sheet (A), since this rules out the inhibiting effect of atmospheric oxygen and allows complete curing to be accomplished particularly rapidly.

If desired, curing with actinic radiation can also be assisted by heat, in which case the above-described methods and apparatus may be employed. The heat energy, however, may also come from the actinic radiation sources. Heat treatment may take place before, during and/or after exposure to actinic radiation. It may also be carried out before and/or after the temporary carrier sheet (A) is removed.

Where the laminated sheets of the invention further comprise layers (C) which are curable with actinic radiation, they are fully cured together with the layers (B). Here again it is also possible to carry out heat treatment. Heat treatment is advisable particularly when the layers (C) are curable physically and/or thermally.

The heat treatment is carried out advantageously at temperatures at which the substrates do not suffer thermal damage.

Viewed in terms of its method, the actinic radiation cure, preferably with UV radiation, especially UV-A radiation, has no peculiarities but can instead be implemented using the customary and known apparatus and methods, as described for example in German patent application DE 198 18 735 A 1, column 10, lines 31 to 61, German patent application DE 103 16 890 A1, page 17, paragraphs [0128] to [0130], international patent application WO 94/11123, page 2, line 35, to page 3, line 6, page 3 lines 10 to 15, and page 8, lines 1 to 14, or American patent U.S. Pat. No. 6,743,466 B2, column 6, line 53, to column 7, line 14.

In visual terms, the damage sites repaired by an inventive procedure fit outstandingly into the surface of the coated substrates and can no longer be seen. Since they no longer have edge breaks, or have only negligibly small edge breaks, it is also no longer possible to feel the repaired damage sites. They meet all of the requirements imposed on automotive finishes (cf. European patent EP 0 352 298 B1, page 15, line 42, to page 17, 10 line 40) and correspond entirely in their appearance to a Class A surface. In particular they are stable to weathering, resistant to chemicals, and scratch resistant.

EXAMPLES

Preparation Example 1

The Preparation of a Binder (B1)

Isopropenylidenedicyclohexanol was coarsely dispersed in hydroxyethyl acrylate at 60° C. with stirring. Added to this suspension were the polyisocyanates, pentaerythritol tri/tetra-acrylate, hydroquinone monomethyl ether, 1,6-di-tert-butyl-p-cresol and methyl ethyl ketone. Following the addition of dibutyl tin dilaurate the reaction mixture became hotter. It was stirred at 75° C. for a number of hours until the free isocyanate group content was constant. Then glycolic acid and methanol were added and the mixture was stirred until free isocyanate groups were no longer detectable.

The hydroxyl-containing compounds and the polyisocyanates were used in amounts so as to give the equivalents ratios indicated below:

| | |
|---|---|
| Isopropenylidenedicyclohexanol | 33.7 eq OH |
| 2-Hydroxyethyl acrylate | 24.7 eq OH |
| Pentaerythritol tri/tetraacrylate (average OH number: 100 to 111 mg KOH/g) | 24.7 eq OH |
| Basonat ® HI 100 from BASF AG | 56.25 eq NCO |
| Allophanate of hexamethylene diisocyanate and 2-hydroxyethyl acrylate according to international patent application WO 00/39183 | 18.75 eq NCO |
| Desmodur ® W from Bayer Aktiengesellschaft | 25 eq NCO |
| Hydroquinone monomethyl ether | 0.05% by weight, based on solids |
| 1,6-Di-tert-butyl-p-cresol | 0.1% by weight, based on solids |
| Methyl ethyl ketone | corresponding to a solids of 70% by weight |
| Dibutyltin dilaurate | 0.02% by weight based on solids |
| Glycolic acid | 6.8 eq OH |
| Methanol | 10.1 eq OH |

The resulting binder (B1) had a glass transition temperature of 2.5° C., a viscosity at 23° C. of 2.0 Pas, an olefinically unsaturated double bond content of 3.12 eq/kg solids, and an acid number of 11.41 mg KOH/g solids. It was outstandingly suitable for preparing aqueous coating materials (B).

Preparation Example 2

The Preparation of a Clearcoat Slurry (B)

738.165 parts by weight of the solution of the binder (B1) from preparation example 1, 10.438 parts by weight of a 50 percent strength solution of Tinuvin® CGL 052 (light stabilizer from Ciba Specialty Chemicals, containing one triazine group and two cyclic, sterically hindered amino ether groups) in methyl ethyl ketone, 9.185 parts by weight of Tinuvin® 400 (light stabilizer from Ciba Specialty Chemicals), 7.228 parts by weight of Lutensol® AT 50 (wetting agent from BASF AG), 8.246 parts by weight of trimethylamine, 20.876 parts by weight of a photoinitiator mixture of Irgacure® 184 from Ciba Specialty Chemicals and Lucirin® TPO from BASF AG (weight ratio 5:1) were mixed with one another. The resulting mixture was dispersed in 1005 parts by weight of deionized water. Added to this dispersion was 0.117 part by weight of ammonium acetate. The degree of neutralization of the binder (B1) was 75%. The dispersion was subsequently filtered through a 1 μm Cuno® white filter.

The filtered dispersion was stirred in an open vessel at room temperature for 24 hours, so that the methyl ethyl ketone evaporated.

The solvent-free dispersion was made up with 0.788 part by weight of Baysilone® AI 3468 (flow control agent from Borchers) and 15.78 parts by weight of Acrysol® RM-8W (nonionic associative thickener from Rohm & Haas).

The z-mean average particle size of the resulting clearcoat slurry was measured by means of photon correlation spectroscopy (Malvern Zetasizer® 1000); it was 140 nm.

The clearcoat slurry had a solids content of 36.2% by weight. It was outstandingly suitable for producing refinish sheets.

Example 1

The Production of a Refinish Sheet

The refinish sheet was produced using the GH-X527 sheet from Bischof+Klein, Lengerich, Federal Republic of Germany, as the temporary carrier sheet (A). The major properties of this sheet are described in German patent application DE 103 35 620 A1, table 1, page 10. The film had an outer side having antiblocking properties. Its side for coating had adhesive properties.

The temporary carrier sheet (A) was coated with the clearcoat slurry from preparation example 2. The resulting wet film (B) was dried in a forced-air oven at 30° C. The resulting dried, uncured layer (B) was 50 μm thick.

The refinish sheet was easy to wind up into rolls and could be stored in that form without sticking.

Example 2

The Production of Refinishes

Refinishes were produced using metal sample panels which had been coated with a multicoat paint system corresponding to an automotive OEM finish and composed of electrocoat, surfacer coat, black basecoat and clearcoat. The clearcoats of the multicoat paint systems were each sanded in one area using abrasive paper (grain sizes 600 μm to 1200 μm). The damaged areas were covered with the refinish sheet from example 1. This brought the clearcoat layers (B) onto the clearcoats of the sample panels. Subsequently the laminated refinish sheets were heated to 60 to 80° C. using an infrared lamp.

The laminated refinish sheets were exposed to UV radiation (1.5 $J/cm^2$; ILD light bug 390; IST unit) through the temporary carrier sheets (A), as a result of which the clearcoat layers (B) were fully cured. Subsequently the temporary carrier sheets (A) were removed.

The resulting refinishes had an outstanding appearance. Adhesion to the existing finishes was outstanding (cross-cut test with adhesive tape removal: rating GT 0-1). They had a smooth surface and outstanding gloss. In addition they were resistant to chemicals, hard, and scratch resistance, as could be underlined by the results set out below.

Chemical Resistance:

| DaimlerChrysler gradient oven test | |
|---|---|
| Test substance | visible damage at |
| Sulfuric acid: | 44° C. |
| NaOH: | 49° C. |
| Tree resin: | >75° C. |
| Deionized water: | >75° C. |

Hardness:

Fischerscope penetration hardness: 137.4 $N/mm^2$ at 25.6 mN

Scratch Resistance:

Amtec-Kistler laboratory wash unit: residual gloss after cleaning: 85%

What is claimed is:

1. A method of repairing a surface of a coated substrate, comprising:

(I) laminating at least one refinish sheet to a coated side or to a location on the surface of the coated substrate, the at least one refinish sheet prepared by:

(1) coating one side of a temporary carrier sheet (A) with at least one aqueous coating material (B) comprising at least one free-radically crosslinkable binder (B1) having a glass transition temperature of −70 to +50°C., an olefinically unsaturated double bond content of 2 to 10 eq/kg, and an acid group content of 0.05 to 15 eq/kg to produce at least one resultant layer, wherein the free-radically crosslinkable binder (B1) is selected from the group consisting of oligomeric and polymeric epoxy (meth)acrylates, urethane (meth)acrylates, and carbonate (meth)acrylates, and wherein the aqueous coating material (B) is a structurally viscous dispersion that is free, or substantially free, from volatile organic compounds and that comprises, as its disperse phase, solid particles, viscous particles, or a combination thereof, wherein the disperse phase is dimensionally stable under storage and application conditions and has an average particle size as measured by photon correlation spectroscopy of 80 to 750 nm;

(2) drying but not curing, or only part-curing, the at least one resultant layer to produce at least one dried, uncured or part-cured layer; and (3) optionally, partly or fully covering the at least one dried, uncured or part-cured layer by at least one dried, uncured or part-cured layer (C) which is curable physically, thermally and/or with actinic radiation and is selected from the group consisting of layers which serve to produce color and/or effect basecoats, surfacer coats, and antistonechip priming coats; and (II) fully curing with actinic radiation the dried, uncured or part-cured layer in step (2) or said layer in step (2) and optional layer (C) if present ,before or after removing the temporary carrier sheet (A).

2. The method of claim 1, wherein the coated substrate is a painted automobile body or part thereof.

3. The method of claim 1, wherein the coated side or the location on the surface of the coated substrate is pretreated.

4. The method of claim 1, wherein the at least one refinish sheet is laminated using pressure, heat, or a combination thereof.

5. The method of claim 1, wherein the dried, uncured or part-cured layer or said layer and layer (C) are fully cured with actinic radiation before the temporary carrier sheet (A) is taken away.

6. The method of claim 1, wherein the actinic radiation is UV radiation or electron beams.

7. The method of claim 1, further comprising removing the temporary carrier sheet (A).

8. The method of claim 1, wherein the temporary carrier sheet (A) is a polymeric sheet having:

a storage modulus E' of $10^7$ to $10^9$ Pa in the temperature range from room temperature to 100° C.;

a breaking elongation at 23° C. of 300% to 1500% longitudinally and transversely with respect to the preferential direction generated during the production of (A) by means of directed production techniques; and a transmittance >70% for UV radiation and visible light with a wavelength of 230 to 600 nm, at a layer thickness of 50 μm; and wherein the one side of the temporary carrier sheet (A) facing the at least one dried, uncured or part-cured layer or a coating producible therefrom has:

a hardness of 0.005 to 0.06 GPa at 23° C.; and a roughness as determined by means of atomic force microscopy (AFM) that corresponds to an $R_a$ value over a 50 $\mu m^2$ sampling area of 5 to 30 nm.

9. The method of claim 1, wherein the temporary carrier sheet (A) is removed from the at least one dried, uncured or part-cured layer or from a coating producible therefrom using an average force of 10 to 250 mN/cm.

10. The method of claim 1, wherein the temporary carrier sheet (A) is selected from the group consisting of sheets of polyethylene, polypropylene, ethylene copolymers, propylene copolymers, and ethylene-propylene copolymers.

11. The method of claim 1, wherein:

the one side of the temporary carrier sheet (A) that faces the at least one dried, uncured or part-cured layer or a coating producible therefrom comprises embossing;

a side of the temporary carrier sheet (A) that faces away from the at least one dried, uncured or part-cured layer or from the coating producible therefrom comprises antiblocking properties;

or a combination thereof.

12. The method of claim 1, wherein the temporary carrier sheet (A) is constructed from two or more layers.

13. The method of claim 1, wherein the temporary carrier sheet (A) is constructed from at least one core layer (A1) comprising at least one homopolymer or copolymer and from at least one further layer selected from the group consisting of adhesive layers (A2) and antiblocking layers (A3).

14. The method of claim 1, wherein the homopolymers and copolymers of the core layer (A1) are selected from the group consisting of polyethylene, polypropylene, ethylene copolymers, propylene copolymers, and ethylene-propylene copolymers.

15. The method of claim 1, wherein the at least one free-radically crosslinkable binder (B1) has a number-average molecular weight of 1,000 to 50,000 daltons.

16. The method of claim 1, wherein the olefinically unsaturated double bonds are present in (meth)acrylate groups.

17. The method of claim 1, wherein the at least one free-radically crosslinkable binder (B1) is an oligomeric or polymeric urethane (meth)acrylate.

18. The method of claim 1, wherein the dried, uncured or part-cured layer is partly or fully covered by at least one dried, uncured or part-cured layer (C) which is curable physically, thermally and/or with actinic radiation and is selected from the group consisting of layers which serve to produce color and/or effect basecoats, surfacer coats, and antistonechip priming coats.

19. A method of repairing a surface of a coated substrate, comprising:

(I) laminating at least one refinish sheet to a coated side or to a location on the surface of the coated substrate, the at least one refinish sheet prepared by:

(1) coating one side of a temporary carrier sheet (A) with at least one aqueous coating material (B) comprising at least one free-radically crosslinkable binder (B1), in an amount of 60% to 99% by weight based on the film-forming solids of the aqueous coating material, having a glass transition temperature of —70 to +50° C., an olefinically unsaturated double bond content of 2 to 10 eq/kg, and an acid group content of 0.05 to 15 eq/kg to produce at least one resultant layer, wherein the free-radically crosslinkable binder (B1) is a urethane (meth)acrylate and wherein the aqueous coating material (B) is a structurally viscous dispersion that is free, or substantially free, from volatile organic compounds and that comprises, as its disperse phase, solid particles, viscous particles, or a combination thereof, wherein the disperse phase is dimensionally stable under storage and application conditions and has an average particle size as measured by photon correlation spectroscopy of 80 to 750 nm;

(2) drying but not curing, or only part-curing, the at least one resultant layer to produce at least one dried, uncured or part-cured layer; and (3) optionally, partly or fully covering the at least one dried, uncured or part-cured layer by at least one dried, uncured or part-cured layer (C) which is curable physically, thermally and/or with actinic radiation and is selected from the group consisting of layers which serve to produce color and/or effect basecoats, surfacer coats, and antistonechip priming coats; and (II) fully curing with actinic radiation the dried, uncured or part-cured layer in step (2) or said layer in step (2) and optional layer (C) if present, before or after removing the temporary carrier sheet (A).

20. The method of claim 19, wherein the urethane (meth) acrylate is prepared by the reaction of at least one compound selected from the group consisting of aliphatic, aromatic or cycloaliphatic diisocyanates and polyisocyanates that are unblocked.

* * * * *